United States Patent Office 3,790,603
Patented Feb. 5, 1974

---

3,790,603
6,14-DICHLOROPYRANTHRONE
Fritz Graser, Ludwigshafen, and Gustav Bock, Neustadt, Germany, assignors to Badische Anilin- & Soda-Fabrik Aktiengesellschaft, Ludwigshafen am Rhine, Germany
No Drawing. Filed Feb. 16, 1971, Ser. No. 115,826
Claims priority, application Germany, Feb. 20, 1970, P 20 07 848.2
Int. Cl. C09b 3/42
U.S. Cl. 260—360                                   1 Claim

ABSTRACT OF THE DISCLOSURE 6,14 - dichloropyranthrone and a process for its manufacture from 3,3'-dichloro-2,2'-dimethyl-1,1'-dianthraquinoyl.

6,14-dichloropyranthrone is a pigment dye having excellent coloristic properties.

---

This invention relates to 6,14-dichloropyranthrone, which is eminently suitable as a pigment dye, and also to the manufacture and use of the said compound.

The novel dye of the formula:

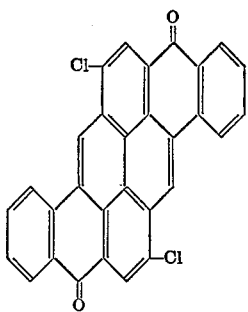

has excellent fastness properties, in particular excellent light and weather fastness as well as high solvent and migration fastness properties. It may be produced by the intramolecular condensation of 2,2'-dimethyl-3,3'-dichloro-1,1'-dianthraquinoyl, for example by a method similar to the process for the production pyranthrone as disclosed in German Pat. 175,067 or the Fiat Final Report 1313 II, p. 114.

However, a particularly advantageous method of producing the new dye comprises heating 2,2'-dimethyl-3,3'-dichloro-1,1'-dianthraquinoyl in polar organic solvents and in the presence of alkali metal acetates, at from 90° to 210° C., preferably at from 110° to 150° C. Suitable polar organic solvents are, for example, dimethyl sulfoxide, alcohols such as ethylene glycol, diethylene glycol and dipropylene glycol, or organic solvents containing the group

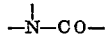

such as dialkyl carboxamides, e.g. dimethyl acetamide and dimethyl formamide, or heterocyclic compounds such as N-methylpyrrolidone or mixtures of such solvents.

The success of the reaction employed for the manufacture of the novel dye depends neither on the amount of alkali metal acetate used nor the amount of solvent of the said type. For example, cyclization takes place when the amount of alkali metal acetate present is as low as the catalytic amount. However, we have found amounts of alkali metal acetate of from 0.5 to 1 mole per mole of 2,2'-dimethyl-3,3'-dichloro-1,1'-dianthraquinoyl to be particularly advantageous for achieving minimum reaction times. Suitable alkali metal acetates are sodium acetate, potassium acetate or mixtures thereof. No limitations are set on the type and amount of solvent used. For example, where low-boiling solvents are used, the process may be carried out at super-atmospheric pressure. However, it is convenient to choose solvents from the above group of solvents which boil in the temperature range stated or above. N-methylpyrrolidone, dimethyl formamide and dimethyl sulfoxide have been found to be particularly advantageous. The amount of solvent used depends on the various technical factors governing the stirrability of the reaction mixture. Where conventional reaction vessels are used, it is convenient to use solvent in an amount of from 2 to 4 times the weight of the dianthraquinoyl. The dye is then obtained in a particularly pure form. It is possible, however, to use the solvent in an amount in excess of the amounts stated above, but no advantage is to be gained from this.

On account of its excellent fastness, the novel dye is highly suitable as a pigment dye for use in a wide variety of applications. The known isomeric compounds, such as 7,15-dichloropyranthrone obtainable by the method disclosed in Example 5 of German Pat. 175,067 or 3,11-dichloropyranthrone described in German Pat. 211,927 possess poor solvent fastness and are thus not suitable for use as pigments. The unsubstituted pyranthrone, obtainable by the methods disclosed in German Pat. 175,067 or Fiat Final Report 1313, II, p. 114, and the tetrabrominated or tribrominated pyranthrones derived therefrom darken on exposure to light and weather and show unfavorable solvent fastness properties. The dichloropyranthrone obtained by chlorinating pyranthrone and known to be useful as a vat dye (cf. German Pat. 563,997) differs from the dye of the present invention in the position of the chlorine atoms in the pyranthrone molecule. The chlorination product is not fast to solvents and shows a high degree of impurity, which is due to its method of manufacture.

The dye of the invention may be used, for example, for coloring printing inks, emulsion paints, distempers and all kinds of lacquer and varnish paints such as nitrocellulose paints, or for the mass coloration of plastics, particularly plasticized polyvinyl chloride and polystyrene, polyethylene or polypropylene. By distempers we mean aqueous pigment preparations containing vegetable and/or animal products, which may be chemically modified, as binders. By emulsion paints we mean pigment preparations comprising an aqueous or non-aqueous organic medium containing the finely divided pigments and also finely divided (dispersed) copolymers acting as binders and coating agents. The dye is also well suited for use in spin-dyeing a wide variety of materials, such as polyvinyl chloride, polyacrylonitrile, copolymers of acrylonitrile with other vinyl compounds, polyamides, cellulose acetate such as two-and-a-half acetate and triacetate and regenerated cellulose.

For use as a pigment, it is advantageous to convert the dye to a finely divided state by conventional methods, for example by milling or redissolving from, say, concentrated sulfuric acid. Milling may be effected with or without the addition of grinding aids such as salts, solvents or diluents. The milled material or the finely divided dye obtained by redissolving from sulfuric acid may be subjected to further treatment, for example heating at elevated temperatures or superatmospheric pressure, in aqueous suspension or in an organic diluent or in a mixture of water and a water-miscible organic diluent. The pigment is thus obtained in various finishes.

Depending on the size of the crystals of the pigment in its final form, the pigment provides colorations ranging from reddish yellow (finely divided form as obtained by redissolving from sulfuric acid in the cold) to orange (coarser crystals).

EXAMPLE 1

200 parts of 2,2'-dimethyl-3,3'-dichlorodianthraquinoyl and 120 parts of anhydrous potassium acetate are heated in 600 parts of N-methylpyrrolidone to 110-115° C. and stirred at this temperature for 2½ hours. The mixture is filtered at 100° C., and the solid residue is washed with warm N-methylpyrrolidone until the washings are light in color, whereupon the material is washed with water until free from solvent and then dried. There are thus obtained 175 parts (94% of theory) of 6,14-dichloropyranthrone in the form of orange needles having excellent solvent fastness. Analysis: Found: 15.0% Cl; calcd.: 14.95% Cl.

If, in place of N-methylpyrrolidone, dimethyl formamide or dimethyl sulfoxide is used as solvent and the process is carried out at 125-130° C., similar results are obtained.

Very similar results are also obtained when the reaction is carried out at a temperature of 148-150° C. in N-methylpyrrolidone. If the temperature is raised to 170-180° C. in N-methylpyrrolidone, the dye is obtained in a yield of about 89% of theory and in a somewhat dull form.

EXAMPLE 2

350 parts of 1,3-dichloro-2-methylanthraquinone, 80 parts of anhydrous o-dichlorobenzene and 130 parts of anhydrous sodium carbonate are heated to 160° C. At this temperature 160 parts of copper powder are added and 10 parts of pyridine are gradually added dropwise, the temperature rising to about 180° C. During the addition of the pyridine, the mixture becomes highly viscous, and 200 parts of anhydrous o-dichlorobenezne are therefore added in portions to obtain a readily stirrable mixture. The mixture is then stirred for 3 hours at 165-170° C. and then diluted with 320 parts of hot o-dichlorobenzene. It is then cooled to about 30° C. and filtered at this temperature. The solid residue is washed with about 400 parts of o-dichlorobenzene and then with about 200 parts of methyl alcohol until free from dichlorobenzene, after which it is washed with water until neutral. The moist filter cake is added to a mixture of 900 parts of water, 70 parts of concentrated sulfuric acid and 610 parts of concentrated hydrochloric acid. The mixture is heated at 60° C., and 53 parts of sodium chlorate are added over 30 minutes. During this addition, the temperature rises to about 95° C. The mixture is filtered hot, washed until neutral and dried. There are thus obtained 276 parts (90% of theory) of 2,2'-dimethyl-3,3'-dichlorodianthraquinoyl. Analysis: Found: 13.8% Cl; calcd.: 13.9% Cl.

50 parts of the 2,2' - dimethyl-3,3'-dichloro-dianthraquinoyl thus obtained are reacted in a process similar to that described in the first paragraph of Example 1. There are thus obtained 45. 8 parts (98.5% of theory) of 6,14-dichloropyranthrone in a pure form.

EXAMPLE 3

(a) 30 parts of the dye obtained by the process described in the first paragraph of Example 1 are dissolved, at 0-5° C., in 1,200 parts of 96% sulfuric acid. Precipitation is effected by pouring the solution onto a mixture of ice and water so that the temperature does not exceed 20° C. The mixture is filtered, and the solid residue is washed with water until neutral and then suction-filtered. There is thus obtained an aqueous dye paste having a solids content of about 12%.

(b) 167 parts of the 12% solids dye paste obtained under (a) above are mixed with 64 parts of a solvent-free soybean-oil-modified alkyd resin and 16 parts of bis-ethylhexyl phthalate and formed into a full-tone paste by flushing on a triple roll mill in 6 passes at 60 atmospheres gage.

(c) 66 parts of binder, obtained by mixing 70 parts of solvent-free, soybean-oil-modified alkyd resin with 17.5 parts of bis-ethylhexyl phthalate and 12.5 parts of a solvent-free resin, are mixed with 30 parts of titanium dioxide (rutile) and 4 parts of a colloidal silicon dioxide and worked up to a titanium dioxide paste on a triple roll mill in 6 passes at 60 atmospheres gage.

(d) 0.4 part of the full-tone paste obtained under (b) above and 5 parts of the titanium dioxide paste obtained under (c) above are mixed together and triturated in a disc grinder. The resulting dye paste is used to produce a coating of paint which is baked at 120° C. for 45 minutes. There is thus obtained a strong reddish yellow coloration having excellent light fastness.

EXAMPLE 4

If Example 3 is repeated, except that in stage (a) the solution of the dye in sulfuric acid is precipitated not at temperatures below 20° C. but at from 30° to 80° C. by pouring the solution into water, there is obtained a strong yellowish orange coloration having excellent light fastness.

EXAMPLE 5

1 part of the full-tone paste obtained in Example 3 (b) is mixed with 3 parts of a binder, obtained by mixing 70 parts of solvent-free soybean-oil-modified alkyd resin with 17.5 parts of bis-ethylhexyl phthalate and 12.5 parts of a solvent-free melamine resin, and the mixture is triturated and thoroughly mixed in a disc grinder. This dye paste is used to produce a coating of paint, which is baked at 120° C. for 45 minutes. There is thus obtained a strong brilliant orange coloration having very good fastness and very good overspraying fastness.

EXAMPLE 6

0.2 part of the dye prepared according to the first paragraph of Example 1 and 1 part of titanium dioxide (rutile) are tumbled dry onto 100 parts of granulated polystyrene block copolymer. The mixture is melted and homogenized in a screw extruder at a barrel temperature of 200-220° C. The colored plastic mass is granulated either by face cutting or by drawing out filaments with cooling. The resulting granules are then injection molded at 200-250° C. or are compression molded to form shaped articles. The resulting moldings have a clear orange color of very good light fastness and bleed resistance.

In the above example, the polystyrene block copolymer may be replaced by a polystyrene emulsion polymer or suspension polymer or by copolymers of styrene with butadiene and acrylonitrile or acrylic esters.

We claim:
1. The dye of the formula:
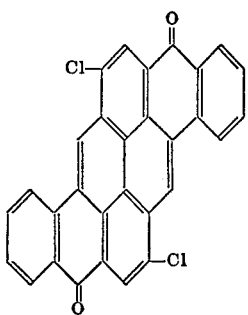
References Cited
UNITED STATES PATENTS
| 856,811 | 6/1907 | Scholl | 260—360 |
| 2,023,926 | 12/1935 | Kranzlein et al. | 260—360 |
| 3,673,220 | 6/1972 | Bock | 260—360 |
FOREIGN PATENTS
| 607,393 | 12/1934 | Germany | 260—360 |
LORRAINE A. WEINBERGER, Primary Examiner
E. J. SKELLY, Assistant Examiner
U.S. Cl. X.R.
8—4, 34; 106—23, 168, 193 P, 204; 260—37 N, 71 C

UNITED STATES PATENT OFFICE
CERTIFICATE OF CORRECTION

Patent No. 3,790,603         Dated February 5, 1974

Inventor(s) Fritz Graser & Gustav Bock

It is certified that error appears in the above-identified patent and that said Letters Patent are hereby corrected as shown below:

Column 1, line 14, "6,14-dichloropropyranthrone" should read -- 6,14-dichloropyranthrone --.

Column 2, line 28, insert -- properties -- after "fastness".

Column 3, line 53-54, "o-dichlorobenezne" should read -- o-dichlorobenzene --.

Column 3, lines 60-61, "dichlorobenzene" should read -- o-dichlorobenzene --.

Column 4, line 17, insert -- , -- after "free".

Column 4, line 24, insert -- melamine -- before "resin".

Column 4, line 60, "part" should read -- parts --.

Signed and sealed this 8th day of October 1974.

(SEAL)
Attest:

McCOY M. GIBSON JR.
Attesting Officer

C. MARSHALL DANN
Commissioner of Patents